United States Patent
Lemus et al.

(10) Patent No.: US 11,070,673 B1
(45) Date of Patent: *Jul. 20, 2021

(54) CALL MONITORING AND FEEDBACK REPORTING USING MACHINE LEARNING

(71) Applicant: Bank of America Corporation, Charlotte, NC (US)

(72) Inventors: Brian E. Lemus, Los Angeles, CA (US); Charles C. Zhou, Lewis Center, OH (US); Bernis N. Smith, Indian Trail, NC (US); Milton Stanley Prime, Charlotte, NC (US)

(73) Assignee: Bank of America Corporation, Charlotte, NC (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/087,747

(22) Filed: Nov. 3, 2020

Related U.S. Application Data

(63) Continuation of application No. 15/931,842, filed on May 14, 2020, now Pat. No. 10,841,424.

(51) Int. Cl.
| | | |
|---|---|---|
| *H04M 3/51* | (2006.01) | |
| *H04M 3/42* | (2006.01) | |
| *G10L 15/18* | (2013.01) | |
| *G10L 15/26* | (2006.01) | |
| *G10L 15/187* | (2013.01) | |
| *G10L 15/08* | (2006.01) | |

(52) U.S. Cl.
CPC ......... *H04M 3/5175* (2013.01); *G10L 15/187* (2013.01); *G10L 15/1815* (2013.01); *G10L 15/26* (2013.01); *H04M 3/42221* (2013.01); *G10L 2015/088* (2013.01); *H04M 2201/41* (2013.01); *H04M 2203/401* (2013.01)

(58) Field of Classification Search
None
See application file for complete search history.

(56) References Cited

U.S. PATENT DOCUMENTS

| | | |
|---|---|---|
| 5,864,807 A | 1/1999 | Campbell et al. |
| 5,864,810 A | 1/1999 | Digalakis et al. |
| 6,335,962 B1 | 1/2002 | Ali et al. |
| 6,463,413 B1 | 10/2002 | Applebaum et al. |
| 6,651,042 B1 | 11/2003 | Field et al. |

(Continued)

FOREIGN PATENT DOCUMENTS

GB 2564639 A 1/2019

*Primary Examiner* — Harry S Hong
(74) *Attorney, Agent, or Firm* — Michael A. Springs

(57) ABSTRACT

A device configured to obtain at least a portion of a phone call and to identify a voice signal associated with a person on the phone call. The device is further configured to generate metadata for the phone call and a transcript for the phone call. The device is further configured to input the transcript and the metadata into a machine learning model and to receive a call profile from the machine learning model. The call profile includes a first call classification for the phone call. The device is further configured to identify a call log associated with the phone call that includes a second call classification for the phone call. The device is further configured to determine that the first call classification does not match the second call classification, to generate a feedback report that identifies the first call classification, and to output the feedback report.

20 Claims, 3 Drawing Sheets

(56) References Cited

U.S. PATENT DOCUMENTS

| | | |
|---|---|---|
| 6,697,778 B1 | 2/2004 | Kuhun et al. |
| 6,708,146 B1 | 3/2004 | Sewall et al. |
| 6,804,647 B1 | 10/2004 | Heck et al. |
| 7,062,019 B2 | 6/2006 | Krack |
| 7,136,458 B1 | 11/2006 | Zellner et al. |
| 7,149,689 B2 | 12/2006 | Yacoub |
| 7,664,636 B1 | 2/2010 | Hirschberg et al. |
| 7,698,129 B2 | 4/2010 | Adachi et al. |
| 7,724,889 B2 | 5/2010 | Bushey et al. |
| 7,751,551 B2 | 7/2010 | Bushey et al. |
| 8,223,954 B2 | 7/2012 | Dallessandro et al. |
| 8,280,030 B2 | 10/2012 | Bushey et al. |
| 8,326,643 B1 | 12/2012 | Eshkenazi et al. |
| 8,751,232 B2 | 6/2014 | Bushey et al. |
| 8,971,503 B1 | 3/2015 | Kargman |
| 9,112,972 B2 | 8/2015 | Bushey et al. |
| 10,033,867 B2 | 7/2018 | Stillman |
| 10,044,860 B2 | 8/2018 | Odinak et al. |
| 10,129,402 B1 | 11/2018 | Conway et al. |
| 10,262,268 B2 | 4/2019 | Denson et al. |
| 10,268,729 B1 | 4/2019 | Nadav |
| 10,565,509 B2 | 2/2020 | London |
| 10,841,424 B1 * | 11/2020 | Lemus .................. G10L 15/187 |
| 2002/0169606 A1 | 11/2002 | Bantz et al. |
| 2002/0194002 A1 | 12/2002 | Petrushin |
| 2004/0015356 A1 | 1/2004 | Nakamura et al. |
| 2005/0102135 A1 | 5/2005 | Goronzy et al. |
| 2005/0288927 A1 | 12/2005 | Kim et al. |
| 2006/0047497 A1 | 3/2006 | Chen et al. |
| 2006/0056602 A1 | 3/2006 | Bushey et al. |
| 2006/0072727 A1 | 4/2006 | Bantz et al. |
| 2007/0121824 A1 | 5/2007 | Agapi et al. |
| 2007/0136069 A1 | 6/2007 | Veliu et al. |
| 2007/0201678 A1 | 8/2007 | Marquette et al. |
| 2007/0219800 A1 | 9/2007 | Hymel et al. |
| 2008/0084971 A1 | 4/2008 | Dhanakshirur |
| 2008/0189171 A1 | 8/2008 | Wasserblat et al. |
| 2009/0006085 A1 | 1/2009 | Horvitz et al. |
| 2009/0052636 A1 | 2/2009 | Webb et al. |
| 2009/0271191 A1 | 10/2009 | Marquette et al. |
| 2009/0306966 A1 | 12/2009 | Hejna, Jr. |
| 2012/0020473 A1 | 1/2012 | Mart et al. |
| 2012/0059655 A1 | 3/2012 | Cartales |
| 2013/0332158 A1 | 12/2013 | Corfield et al. |
| 2014/0314225 A1 | 10/2014 | Riahi et al. |
| 2015/0350438 A1 | 12/2015 | Arslan et al. |
| 2016/0379281 A1 | 12/2016 | Laxmanan et al. |
| 2017/0032790 A1 | 2/2017 | Webb et al. |
| 2018/0018318 A1 | 1/2018 | Majumder |
| 2018/0018705 A1 | 1/2018 | Tognetti |
| 2018/0165062 A1 | 6/2018 | Yoo et al. |
| 2019/0373105 A1 | 12/2019 | Kung et al. |
| 2020/0243094 A1 | 7/2020 | Thomson et al. |

* cited by examiner

US 11,070,673 B1

CALL MONITORING AND FEEDBACK REPORTING USING MACHINE LEARNING

CROSS-REFERENCE TO RELATED APPLICATIONS

This application is a continuation of U.S. patent application Ser. No. 15/931,842 filed May 14, 2020, by Brian E. Lemus et al., and entitled "CALL MONITORING AND FEEDBACK REPORTING USING MACHINE LEARNING," which is incorporated herein by reference.

TECHNICAL FIELD

The present disclosure relates generally to machine learning, and more specifically to call monitoring and feedback reporting using machine learning.

BACKGROUND

In existing computer systems, there is no consistent solution for analyzing and classifying audio signals such as phone calls. For example, existing systems lack the ability to analyze a phone call, to document any potential issues or concerns that were raised on the phone call, and to route the information about the phone call to the appropriate party. Analyzing phone calls poses several technical challenges. For instance, the discussion on phone calls is typically dynamic because a person can express an idea using a variety of ways. This means that a computer system needs to be able to interpret what a person is saying using a variety of words and expressions. This poses a technical challenge for a computing system when trying to correctly classify a phone call based on the content of the phone call. This can lead to inefficiencies that consume the limited amount of processing resourcing that a computer system has available. By consuming the available processing resources, these inefficiencies will reduce the computer system's ability to process data and reduce the throughput of the computer system.

SUMMARY

The system disclosed in the present application provides a technical solution to the technical problems discussed above by monitoring and classifying phone calls using machine learning. The disclosed system provides several practical applications and technical advantages which include a process for classifying phone calls using a combination of semantic analysis techniques, phonetic analysis techniques, and machine learning. This process improves the computer system's ability to interpret and classify phone calls. This process results in a more consistent and efficient way of analyzing phone calls which allows the computer system to better manage its processing resources. By improving the computer system's ability to manage its resources, the computer system is able to provide a higher throughput compared to using other existing approaches.

In one embodiment, the computer system comprises a call monitoring device that is configured to receive a phone call and to identify audio that is associated with a person (e.g. a customer) on the phone call. The call monitoring device is further configured to perform a sentiment analysis on the audio to generate metadata for the phone call. The metadata identifies keywords that were used by the person on the phone call, characteristics of the audio, and any other suitable type of information about the phone call. Examples of characteristics include, but are not limited to, speech tone, speech rate, speech volume, predetermined keywords that are used, or any other suitable type of characteristics. The call monitoring device is further configured to generate a transcript that contains text that corresponds with the audio of for person on the call. The call monitoring device is further configured to input the transcript and the metadata into a machine learning model to generate a call profile for the phone call. The call profile identifies a call classification for the phone call based on the information provided to the machine learning model.

The call monitoring device is further configured to identify a call log that is associated with the phone call. The call log identifies a call classification that was provided by the person who handled the phone call, for example, a customer service representative. The call monitoring device is further configured to compare the call classification from the machine learning model to the call classification from the call log. When the call classifications match, the call monitoring device determines that the phone call was correctly classified and no further review is necessary. When the call classifications do not match, the call monitoring device determines that the phone call needs further review. In this case, the call monitoring device is configured to generate a feedback report that identifies the call classification from the machine learning model and to output the feedback report to the appropriate party for review.

Certain embodiments of the present disclosure may include some, all, or none of these advantages. These advantages and other features will be more clearly understood from the following detailed description taken in conjunction with the accompanying drawings and claims.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

DETAILED DESCRIPTION

System Overview

Figure 1:
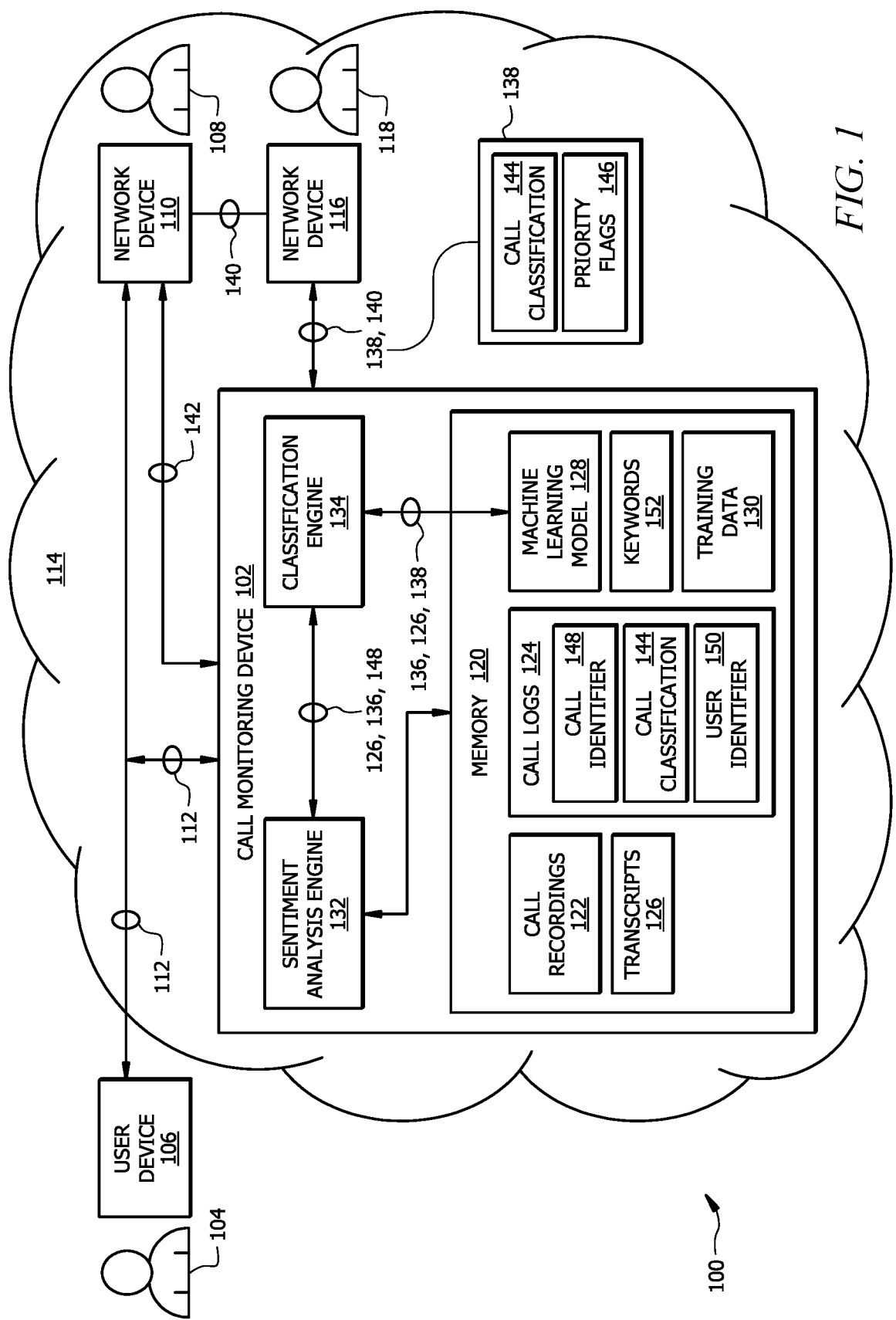
FIG. 1 is a schematic diagram of a call monitoring system configured to use machine learning.

FIG. 1 is a schematic diagram of a call monitoring system 100 configured to use machine learning to analyze and classify phone calls 112. In one embodiment, the system 100 comprises a call monitoring device 102, one or more network devices 110 for receiving phone calls 112, and one or more network devices 116 associated with a quality control unit. The call monitoring device 102, the one or more network devices 110, and the one or more network devices 116 are in signal communication with each other within a network 114.

In FIG. 1, the network device 110 is a device that is associated with a person 108 who receives a phone call 112 within an enterprise. For example, network device 110 may be a phone (e.g. landline phone or cellular phone) or a computer (e.g. a desktop computer, a laptop, or a tablet computer) that is associated with a customer service representative for a business. The network device 116 is a device that is associated with a quality control unit within the enterprise. For example, the network device 116 may be a computer that is associated with a quality control representative 118 that is responsible for resolving and/or investing issues related to received phone calls 112. The system 100 may be configured as shown or in any other suitable configuration.

The network 114 may be any suitable type of wireless and/or wired network including, but not limited to, all or a portion of the Internet, an Intranet, a private network, a public network, a peer-to-peer network, the public switched telephone network, a cellular network, a local area network (LAN), a metropolitan area network (MAN), a wide area network (WAN), and a satellite network. The network 114 may be configured to support any suitable type of communication protocol as would be appreciated by one of ordinary skill in the art.

Call Monitoring Device

The call monitoring device 102 is generally configured to analyze and provide feedback about the classification of phone calls 112. For instance, the call monitoring device 102 may be configured to analyze a phone call 112 and to classify the phone call 112 based on a discussion that occurred during the phone call 112. Examples of phone calls 112 include, but are not limited to, cellular phone calls, landline phone calls, Voice over Internet Protocol (VoIP) calls, teleconference calls, video calls, video conferencing, or any other suitable type of communication with audio. The call monitoring device 102 may be configured to classify a phone call 112 as a complaint call, a praise call, a referral call, a technical support issue call, a general call, a question call, or any other suitable type of phone call 112.

As an example, the call monitoring device 102 may be configured to monitor a phone call 112 between a customer 104 on their user device 106 (e.g. phone or computer) and a customer service representative 108 on their network device 110 (e.g. phone or computer). In one embodiment, the call monitoring device 102 may be configured to receive the phone call 112 in real-time as the phone call 112 takes place between the customer 104 and the customer service representative 108. In another embodiment, the call monitoring device 102 may be configured to receive a recording of the phone call 112 after the phone call 112 has been completed.

The call monitoring device 102 comprises a sentiment analysis engine 132, a classification engine 134, and a memory 120. The call monitoring device 102 may be configured as shown or in any other suitable configuration. Additional information about the hardware configuration of the call monitoring device 102 is described in FIG. 3.

The memory 120 is configured to store call recordings 122, call logs 124, transcripts 126, machine learning models 128, training data 130, keywords 152, and/or any other suitable type of data. The call recordings 122 comprise digital recordings of phone calls 112. The call recordings 122 may be stored in the memory 120 in any suitable type of file format. The call logs 124 comprise notes that are taken by a person 108 about a phone call 112 that they received. The call log 124 may comprise a call identifier 148 for the phone call 112, a timestamp, a text description, a call classification 144, a caller's name, a caller's phone number, a call receiver's name, a user identifier 150 for a call receiver, or any other suitable type of information that is associated with a phone call 112. For example, a person 108 may generate a call log that comprises a text description about a phone call 112 and a call classification 144 for the phone call 112. The call classification 144 indicates the type of phone call 112 that was received. The transcripts 126 comprise text that corresponds with the dialog for people on a phone call 112. As an example, a transcript 126 may identify each speaker on a phone call 112 and may comprise text that corresponds with statements that are made by each speaker on the phone call 112.

Examples of machine learning models 128 include, but are not limited to, a multi-layer perceptron or any other suitable type of neural network model. The machine learning models 128 are generally configured to classify phone calls 112. In one embodiment, a machine learning model 128 is configured to receive a transcript 126 and metadata 136 for a phone call 112 as inputs and to output a call profile 138 based on text from the transcript 126 and the metadata 136. The metadata 136 comprises information that is associated with a sentiment and/or phonetic analysis that is performed on a phone call 112. For example, the metadata 136 may identify one or more predetermined keywords 152 that were used on the phone call 112, a speech rate of a person on the phone call 112, a speech tone for a person on the phone call 112, a speech volume for a person on the phone call 112, or any other suitable type of information associated with the dialog of a person on the phone call 112.

The machine learning model 128 has been previously trained using training data 130. During the training process, the machine learning model 128 determines weight and bias values that allow the machine learning model 128 to map different combinations of text (e.g. text from a transcript 126) and metadata 136 information to different call classifications 144. Through this process, the machine learning model 128 is configured to determine a call classification 144 that best corresponds with text from a transcript 126 and metadata 136 that is associated with a phone call 112. The machine learning model 128 may also be configured to provide a score or confidence level for the determined call classification 144. The machine learning model 128 is further configured to determine whether the text from a transcript 126 and metadata 128 information corresponds with any know types of issues. This process allows the machine learning model 128 to identify and set priority flags 136 that are associated with any identified issues based on text from a transcript 126 and metadata 128 information for a phone call 112. The classification engine 134 may train the machine learning model 128 using any suitable technique as would be appreciated by one of ordinary skill in the art.

The call profile 138 comprises classification information for a phone call 112. In one embodiment, a call profile 138 may comprise a call classification 144, a score or confidence level that is associated with a call classification 144, priority flags 146, or any other suitable type of information that is associated with a phone call 112. The machine learning model 128 is configured to use priority flags 146 to indicate that a phone call 112 has characteristics that are associated with one or more call classification 144 and/or issue types. For example, a call profile 138 may comprise a priority flag 146 that is associated with safety issues or legal issues. In this example, by setting the priority flag 146, the machine learning model 128 is able to indicate that a phone call 112 may be important and may require urgent attention. In other examples, the call profile 138 may comprise any other suitable type of priority flags 146. Priority flags 146 may be associated with one or more people or groups within an enterprise. For example, the call monitoring device 102 may be configured to identify a person or group that is associated with a priority flag 146 and to send information to the identified person or group when a priority flag 146 is set by the machine learning model 128.

The training data 130 comprises information that can be used to train or retrain a machine learning model 128 to classify phone calls 112. The training data 130 may comprise keywords 152 and/or metadata 136 information that is associated with an audio signal of a person on a phone call 112. For example, the training data 130 may comprise keywords 152, a speech rate, a speech tone, and/or a speech volume that is associated with a call classification 144 that corresponds with a complaint call. In other examples, the training data 130 may comprise any other suitable type of information that can be used to identify a particular call classification 144.

The keywords 152 comprise one or more predetermined words that the call monitoring device 102 is configured to listen for while analyzing a phone call 112. The call monitoring device 102 is configured to use these keywords 152 to determine a sentiment for a person on a phone call 112 and/or to determine a call classification 144 for a phone call 112. For example, the call monitoring device 102 may be configured to analyze a phone call 112 for keywords 152 and phrases that correspond with an upset customer or a complaint. In this example, keywords 152 and phrases may include words such as "unfair," "frustrated," "upset," "annoyed," "unhappy," "complaint," "manager," "supervisor," "cancel," "no longer bank here," "close my account," "file a complaint," "formal complaint," "speak to the manager," "who is in charge," and swear words. In other examples, the call monitoring device 102 may be configured to analyze the phone call 112 for keywords 152 that correspond with any other type of scenario.

Sentiment Analysis Engine

The sentiment analysis engine 132 is generally configured to receive an audio signal that is associated with a phone call 112 and to process the audio signal to generate a transcript 126 for the phone call 112 and metadata 136 that is associated with the phone call 112. For example, the sentiment analysis engine 132 may be configured to use one or more natural language processing tools or techniques to identify characteristics of a voice signal that is associated with the people on a phone call 112. Examples of characteristics include, but are not limited to, speech tone, speech rate, speech volume, predetermined keywords 152 used, or any other suitable type of characteristics. An example of the sentiment analysis engine 132 in operation is described in FIG. 2.

Classification Engine

The classification engine 134 is generally configured to receive data that is associated with a phone call 112 from the sentiment analysis engine 132, to provide the received information into a machine learning model 128, and to generate a call profile 138 that identifies a call classification 144 for the phone call 112. The classification engine 134 is further configured to compare the determined call classification 144 for the phone call 112 to a call classification 144 from a call log 124 that is associated with the phone call 112 to determine whether the phone call 112 was previously classified correctly. In the event, that the determined call classification 144 for the phone call 112 is different from the call classification 144 from the call log 124, the classification engine 134 is further configured to forward the call profile 138 to a quality control unit for further review. The quality control unit comprises one or more people 118 that are associated with resolving issues related to phone calls 112. The classification engine 134 is further configured to receive user feedback 140 from the quality control unit based on the call profile 138 and to use the user feedback 140 to retrain the machine learning model 128 and/or to provide feedback to the person 108 that originally received and classified the phone call 112. By using a machine learning model 128, the call classification engine 132 is able to improve the call monitoring device's 102 ability to consistently and efficiently classify phone calls 112.

The classification engine 134 is further configured to determine whether the call profile 138 indicates that the phone call 112 is associated with a priority flag 146. In the event that the phone call 112 is associated with a priority flag 146, the classification engine 134 is further configured to identify a person, group, or entity that is associated with the priority flag 146 and to forward the call profile 138 to the appropriate party. An example of the classification engine 134 in operation is described in FIG. 2.

Call Monitoring Process

Figure 2:
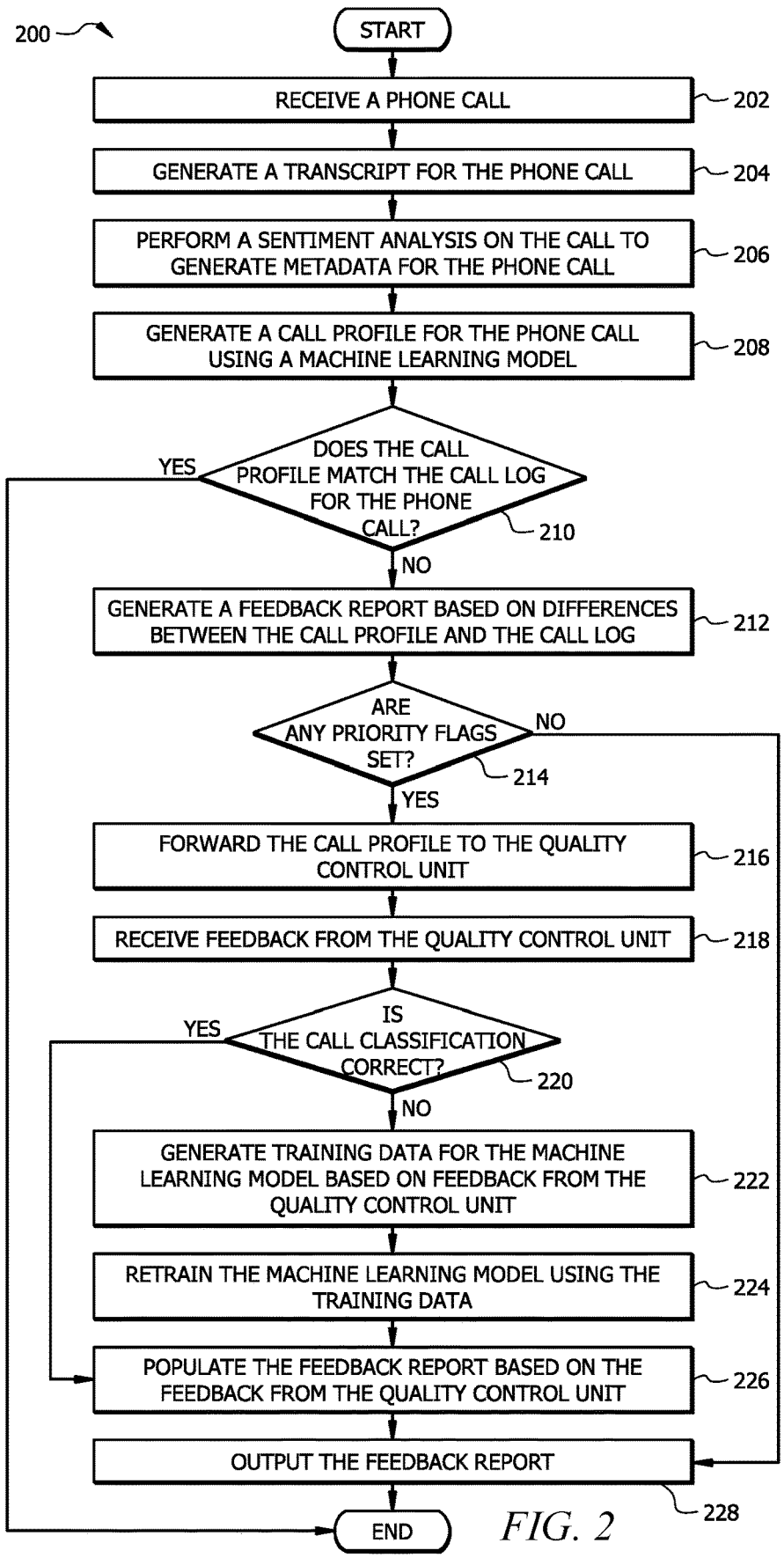
FIG. 2 is a flowchart of an embodiment of a call monitoring method using machine learning.

FIG. 2 is a flowchart of an embodiment of a call monitoring method 200 using machine learning. The call monitoring device 102 may employ method 200 to analyze, to classify, and to provide feedback about phone calls 112. As a non-limiting example, the call monitoring device 102 may be configured to monitor and analyze phone calls 112 between customers 104 and customer service representatives 108 for an enterprise. In this example, the call monitoring device 102 uses method 200 to analyze phone calls 112 to determine whether they were classified correctly by the customer representative 108 who handled the phone call 112. This process allows the call monitoring device 102 to provide feedback to the customer service representative 108 about how to improve their classification of phone calls 112. In addition, this process also allows the call monitoring device 102 to obtain feedback about how well the machine learning model 128 is performing to classify phone calls 112 and to generate training data 130 that can be used to retrain the machine learning model 128 to improve the performance of the machine learning model 128.

At step 202, the sentiment analysis engine 132 receives a phone call 112. In one embodiment, the call monitoring device 102 may be configured to receive the phone call 112 in real-time as it takes place between the customer 104 and the customer service representative 108. In another embodiment, the call monitoring device 102 may be configured to receive a recording of the phone call 112 after the phone call 112 has been completed. The sentiment analysis engine 132 is configured to use speech recognition to identify voice signals that correspond with the people on the phone call 112.

At step 204, the sentiment analysis engine 132 generates a transcript 126 for the phone call 112. The sentiment analysis engine 132 is configured to use one or more natural language processing tools or techniques to convert an audio signal of the phone call 112 into a text-based transcript 126. In one embodiment, the sentiment analysis engine 132 is configured to use natural language processing techniques to identify the different speakers on the phone call 112 based on the tone of their voice. For example, the sentiment analysis engine 132 may be configured to identify a first speech tone that corresponds with a customer 104 and a second speech tone that corresponds with a customer service representative 108. In this case, the sentiment analysis engine 132 may be configured to label the text that corresponds with each person on the phone call 112 in the generated transcript 126.

At step 206, the sentiment analysis engine 132 performs a sentiment analysis on the phone call 112 to generate metadata 136 for the phone call 112. The sentiment analysis engine 132 may be configured to use one or more natural language processing tools or techniques to identify characteristics of a voice signal that is associated with a person (e.g. a customer 104) on a phone call 112. The metadata 136 identifies one or more keywords 152 that the person used on the phone call 112 as well as characteristics of the voice signal for the person. As an example, the characteristics of the voice signal may comprise a speech tone for the person the phone call 112. In this example, the speech tone may be used to determine the mood of the person on the phone call 112. For instance, a harsh tone may indicate that the person is upset while a neutral tone may indicate that the person is not upset. As another example, the characteristics of the voice signal may comprise a speech rate (e.g. words per minute) for the person on the phone call 112. In this example, the speech rate may also be used to determine the mood of the person on the phone call 112. For instance, a fast speech rate may indicate that the person is upset while a slower speech rate may indicate that the person is not upset. As another example, the characteristics of the voice signal may comprise a speech volume or magnitude. In this example, the speech volume may also be used to determine the mood of the person on the phone call 112. For instance, a higher speech volume may indicate that the person on the phone call 112 is upset while a lower speech volume may indicate that the person is not upset. In other embodiments, the sentiment analysis engine 132 may identify any other suitable characteristics or combination of characteristics of the voice signal for the person on the phone call 112.

In one embodiment, the sentiment analysis engine 132 is configured to use numeric values to represent a characteristic of the voice signal. For example, the sentiment analysis engine 132 may use a numeric value that represents a speech rate in words per minute. As another example, the sentiment analysis engine 132 may use a numeric value that represents a speech volume magnitude, for example, in decibels (dBs). The sentiment analysis engine 132 may also be configured to use text labels to represent characteristics of the voice signal. For example, the sentiment analysis engine 132 may use a text descriptor word to represent a speech tone. For instance, the sentiment analysis may use a label such as "upset" to identify a speech tone. In other examples, the sentiment analysis engine 132 may use any other suitable technique to represent characteristics of the voice signal.

The sentiment analysis engine 132 may be configured to determine whether any keywords 152 from among a set of predetermined keywords 152 are present within the voice signal. For example, the sentiment analysis engine 132 may be configured to analyze the voice signal for keywords 152 and phrases that correspond with an upset customer or a complaint. In this example, keywords 152 and phrases may include words such as "unfair," "frustrated," "upset," "annoyed," "unhappy," "complaint," "cancel," "manager," "supervisor," "no longer bank here," "close my account," "file a complaint," "formal complaint," "speak to the manager," "who is in charge," and swear words. In other examples, the sentiment analysis engine 132 may be configured to analyze the voice signal for keywords 152 that correspond with any other type of call classification 144.

In one embodiment, the sentiment analysis engine 132 may be configured to use natural language processing techniques to detect and identify keywords 152 from the voice signal of a person on the phone call 112. For example, the sentiment analysis engine 132 may use speech recognition to identify words that are used on the call and to compare the identified words to the predetermined keywords 152. In another embodiment, the sentiment analysis engine 132 may be configured to use natural language processing techniques to detect and identify keywords 152 from the generated transcript 126. For example, the sentiment analysis engine 132 may be configured to use text recognition on the transcript 126 to identify words that are used on the call and to compare the identified words to the predetermined keywords 152.

In some embodiments, the sentiment analysis engine 132 may be configured to only identify keywords 152 that are associated with a particular person (e.g. a customer 104) that is on the phone call 112. For example, the sentiment analysis engine 132 may be configured to use speech recognition to identify a first speech tone that corresponds with a customer 104 and a second speech tone that corresponds with a customer service representative 108. In this case, the sentiment analysis engine 132 may be configured to only identify keywords 152 that are used by the customer 104. As another example, the sentiment analysis engine 132 may be configured to identify keywords 152 within the text of the transcript 126 that is associated with customer 104.

In one embodiment, the metadata 136 may comprise a plurality of entries that are each associated with different predetermined keywords 152 and phrases. In this example, the sentiment analysis engine 132 is configured to set each entry to value that indicates whether the keyword 152 or phrase is present in the phone call 112. For instance, each entry may be initially set to a first value (e.g. a Boolean value of zero) that indicates that a keyword 152 or phrase is not present in the phone call 112. In response to determining that a keyword 152 or phrase is present in the phone call 112, the sentiment analysis engine 132 is configured to change the value of the corresponding keyword 152 or phrase to a second value (e.g. a Boolean value of one) that indicates that the keyword 152 or phrase is present in the phone call 112.

After generating the transcript 126 and the metadata 136 for the phone call 112, the sentiment analysis engine 132 may associate a call identifier 148 for the phone call 112 with the transcript 126 and the metadata 136. Examples of a call identifier 148 include, but are not limited to, a phone number, a name, an account number, an alphanumeric code, or any other suitable type of identifier. The sentiment analysis engine 132 then sends the transcript 126, the metadata, and the call identifier 148 to the classification engine 134 for processing to determine a call classification 144 for the phone call 112.

At step 208, the classification engine 134 generates a call profile 138 using a machine learning model 128. The classification engine 134 is configured to input the transcript 126 and the metadata 136 for the phone call 112 into the machine learning model 128. The machine learning model 128 is configured to generate and output a call profile 138 for the phone call 112 based on the received transcript 126 and metadata 136. In one embodiment, the call profile 138 comprises a call classification 144 and one or more priority flags 146. The call classification 144 identifies a classification type for the phone call 112. Examples of call classifications 144 include, but are not limited to, a complaint call, a praise call, a referral call, a technical support issue call, a general call, a question call, or any other suitable type of phone call 112.

The call profile 138 comprises one or more priority flags 146 that can be set to alert a user about an issue. Priority flags 146 are entries in the call profile 138 that can be set different values to indicate whether an issue has been detected on the phone call 112. Priority flags 146 may be initially set to a first value (e.g. a Boolean value of zero) that indicates that an issue has not been detected in the phone call 112. In response to the machine learning model 128 detecting an issue on the phone call 112, the machine learning model 128 is configured to identify a priority flag 146 that corresponds with the identified issue and then sets the identified priority flag 146 to a second value (e.g. a Boolean value of one) that indicates that the issue is present in the phone call 112. As an example, the machine learning model 128 may detect a legal issue based on identified keywords 152 that are used during the phone call 112. The machine learning model 128 may then identify a priority flag 146 that is associated with the legal issue and set the priority flag 146 to a value that indicates that the phone call 112 should be reviewed for potential legal issues. In other examples, the machine learning model 128 may set priority flags 146 that are associated with safety issues, ethical issues, legal issues, governance issues, regulation issues, employee abuse issues, sales practice issues, unfair or deceptive practice issues, fair credit reporting act issues, or any other suitable type of issues. In other examples, the call profile 138 may further comprises any other suitable type of information about the phone call 112.

After classifying the phone call 112, the classification engine 134 is configured to review of the phone call 112 was classified by the person 108 who handled the phone call 112 to determine whether the phone call 112 was correctly classified and to determine if there are any issues that need to be further reviewed by the quality control unit. At step 210, the classification engine 134 determines whether the call profile 138 matches the call log 124 for the phone call 112. In one embodiment, the classification engine 134 may use the call identifier 148 that is associated with the received transcript 126 and metadata 136 to identify a call log 124 for the phone call 112. For example, the classification engine 134 may use the call identifier 148 as a search token to look for call logs 124 that are stored in the memory 120 that are associated with the call identifier 148. After identifying a call log 124 that corresponds with the call identifier 148, the classification engine 134 then determines a call classification 144 for the phone call 112 based on the information provided the person who handled the phone call 112. For example, the call log 124 may comprise a call classification 144 that was provided by the customer service representative 108 handled the phone call 112. The classification engine 134 then compares the call classification 144 from the call profile 138 that is generated by the machine learning model 128 to the call classification 144 in the call log 124 to determine whether the call classifications 144 are the same.

The classification engine 134 terminates method 200 in response to determining that the call profile 138 matches the call log 124 for the phone call 112. In this case, the classification engine 134 determines that the person who handled the phone call 112 correctly classified the phone call 112 and no further review is necessary. The classification engine 134 proceeds to step 212 in response to determining that the call profile 138 does not match the call log 124 for the phone call 112. In this case, the classification engine 134 determines that the person who handled the phone call 112 has misclassified the phone call 112. When the person who handled the phone call 112 misclassifies the phone call 112, the classification engine 134 will then generate a feedback report 142 to provide training information to the person who handled the phone call 112. In addition, the classification engine 134 will also forward the call profile 138 to the quality control unit for further review.

At step 212, the classification engine 134 generates a feedback report 142 based on differences between the call profile 138 and the call log 124 for the phone call 112. The feedback report 142 generally comprises information that can be used to train or inform the person that handled the phone call 112 how to improve their call classifications. For example, the feedback report 142 may comprise the call classification 144 that was determined by the machine learning model 128 as well as information about why the call classification 144 was chosen. In other examples, the feedback report 142 may further comprise the transcript 126, the metadata 136, a summary about the phone call 112, instructions, or any other suitable type of information. The feedback report 142 may be a text document, an email, application notification, or any other suitable type of document for providing information to a user.

At step 214, the classification engine 134 determines whether there are any priority flags 146 set in the call profile 138. The classification engine 134 may analyze the values of the priority flags 146 within the call profile 138 to determine whether any of the priority flags 146 have been set to a value that indicates that an issue is present based on the phone call 112. The classification engine 134 proceeds to step 228 in response to determining that there are no priority flags 146 set in the call profile 138. In this case, the classification engine 134 does not need to forward the call profile 138 to the quality control unit for further review. Otherwise, the classification engine 134 proceeds to step 216 in response to determining that there are one or more priority flags 146 set in the call profile 138. In this case, the classification engine 134 forwards the call profile 138 to the quality control unit for further review because of the issues that are present on the phone call 112.

At step 216, the classification engine 134 forwards the call profile 138 to the quality control unit. For example, the classification engine 134 may send the call profile 138 to a network device 116 that is associated with the quality control unit. In some embodiments, the classification engine 134 may also identify any other people or groups that are associated with keywords 152 that were used on the phone call 112 and/or priority flags 146 that were set by the machine learning model 128 and forwards the call profile 138 to the appropriate party as well for review.

At step 218, the classification engine 134 receives user feedback 140 from the quality control unit. The user feedback 140 may indicate whether the call classification 144 that was determined by the machine learning model 128 is correct. In some examples, the user feedback 140 may comprise additional instructions and/or information for the person that handled the phone call 112. In some embodiments, the classification engine 134 may also include additional instructions and/or information from any other people or groups that provide feedback to the classification engine 134 based on the call profile 138.

At step 220, the classification engine 134 determines whether the call classification 144 is correct in the call profile 138 based on the user feedback 140 from the quality control unit. For example, the user feedback 140 may comprise a data field that indicates whether the call classification 144 that was determined by the machine learning model 128 is correct. The classification engine 134 proceeds to step 226 in response to determining that the call classification 144 is correct in the call profile 138. In this case, the classification engine 134 determines that the machine learning model 128 has correctly classified the phone call 112 does not need to be retrained. The classification engine 134 proceeds to step 222 in response to determining that the call classification 144 is not correct in the call profile 138. In this case, the classification engine 134 determines that the machine learning model 128 has incorrectly classified the phone call 112 and that the machine learning model 128 needs to be retrained.

At step 222, the classification engine 134 generates training data 130 for the machine learning model 128 based on the user feedback 140 from the quality control unit. Here, the classification engine 134 extracts and compiles information from the user feedback 140 that can be used to retrain the machine learning model 128. For example, the user feedback 140 may comprise keywords 152 or characteristics for a voice signal that can be used as training data 130 to retrain the machine learning model 128. In other examples, the user feedback 140 may comprise any other suitable type or combination of information that can be used to retrain the machine learning model 128.

At step 224, the classification engine 134 retrains the machine learning model 128 using the training data 130. The classification engine 134 may use any suitable technique for training the machine learning model 128 using the training data 130 as would be appreciated by one of ordinary skill in the art. By retraining the machine learning model 128, the classification engine 134 is able to improve the accuracy of the machine learning model 128 that is used to classify phone calls 112.

At step 226, the classification engine 134 populates the feedback report 142 based on the user feedback 140 from the quality control unit. Here, the classification engine 134 updates the feedback report 142 to include any additional instructions and/or information that was provided by the quality control unit and/or any other groups.

At step 228, the classification engine 134 outputs the feedback report 142. Here, the classification engine 134 sends the feedback report 142 to the person who handled the phone call 112. For example, the classification engine 134 may use the user identifier 150 from the call log 124 that is associated with the phone call 112 to identify a network device 116 that is associated with the person who handled the phone call 112. In this example, the user identifier 150 may be a phone number, a MAC address, an IP address, or any other suitable type of identifier for identifying the network device 116 that is associated with a person. As another example, the classification engine 134 may use the user identifier 150 from the call log 124 to identify contact information for the person who handled the phone call 112. In this example, the user identifier 150 may be a phone number, an email address, an address, or any other suitable type of information for identifying a person. As another example, the classification engine 134 may use speech recognition to identify the person who handled the phone call 112. As another example, the classification engine 134 may use information from the transcript 126 and/or the metadata 136 to identify the person who handled the phone call 112. For instance, the transcript 126 may comprise an identifier for the person who was speaking with the customer. In other examples, the classification engine 134 may use any other suitable technique for identifying the person who handled the phone call 112.

After providing the feedback report 142 to the person who handled the phone call 112 and/or retraining the machine learning model 128, the classification engine 134 may continue to monitor and analyze other phone calls 112.

Call Monitoring Device Hardware Configuration

Figure 3:
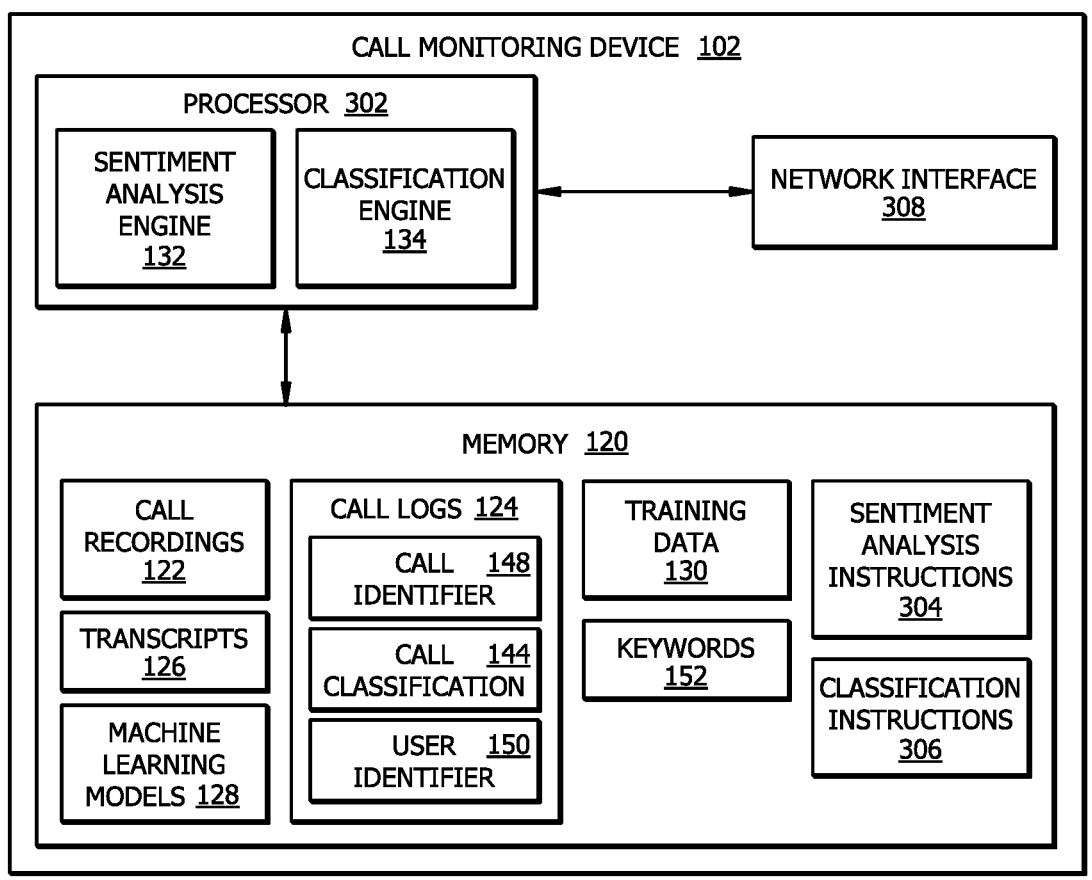
FIG. 3 is a schematic diagram of an embodiment of a device configured to monitor calls using machine learning.

FIG. 3 is a schematic diagram of an embodiment of a device (e.g. call monitoring device 102) configured to use machine learning for monitoring and classifying phone calls 112. The call monitoring device 102 comprises a processor 302, a memory 120, and a network interface 308. The call monitoring device 102 may be configured as shown or in any other suitable configuration.

The processor 302 comprises one or more processors operably coupled to the memory 120. The processor 302 is any electronic circuitry including, but not limited to, state machines, one or more central processing unit (CPU) chips, logic units, cores (e.g. a multi-core processor), field-programmable gate array (FPGAs), application-specific integrated circuits (ASICs), or digital signal processors (DSPs). The processor 302 may be a programmable logic device, a microcontroller, a microprocessor, or any suitable combination of the preceding. The processor 302 is communicatively coupled to and in signal communication with the memory 120. The one or more processors are configured to process data and may be implemented in hardware or software. For example, the processor 302 may be 8-bit, 16-bit, 32-bit, 64-bit or of any other suitable architecture. The processor 302 may include an arithmetic logic unit (ALU) for performing arithmetic and logic operations, processor registers that supply operands to the ALU and store the results of ALU operations, and a control unit that fetches instructions from memory and executes them by directing the coordinated operations of the ALU, registers and other components.

The one or more processors are configured to implement various instructions. For example, the one or more processors are configured to execute instructions to implement a sentiment analysis engine 132 and a classification engine 134. In this way, processor 302 may be a special-purpose computer designed to implement the functions disclosed herein. In an embodiment, the sentiment analysis engine 132 and the classification engine 134 are each implemented using logic units, FPGAs, ASICs, DSPs, or any other suitable hardware. The sentiment analysis engine 132 and the classification engine 134 are configured to operate as described in FIGS. 1 and 2. For example, the sentiment analysis engine 132 and the classification engine 134 may be configured to perform the steps of method 200 as described in FIG. 2.

The memory 120 comprises one or more disks, tape drives, or solid-state drives, and may be used as an over-flow data storage device, to store programs when such programs are selected for execution, and to store instructions and data that are read during program execution. The memory 120 may be volatile or non-volatile and may comprise a read-only memory (ROM), random-access memory (RAM), ternary content-addressable memory (TCAM), dynamic random-access memory (DRAM), and static random-access memory (SRAM).

The memory 120 is operable to store sentiment analysis instructions 304, classification instructions 306, call recordings 122, transcripts 126, machine learning models 128, call logs 124, training data 130, keywords 152, and/or any other data or instructions. The sentiment analysis instructions 304 may comprise any suitable set of instructions, logic, rules, or code operable to execute the sentiment analysis engine 132. The classification instructions 306 may comprise any suitable set of instructions, logic, rules, or code operable to execute the classification engine 134. The call recordings 122, transcripts 126, machine learning models 128, call logs 124, training data 130, and keywords 152 are configured similar to the call recordings 122, transcripts 126, machine learning models 128, call logs 124, training data 130, and keywords 152 described in FIGS. 1 and 2, respectively.

The network interface 308 is configured to enable wired and/or wireless communications. The network interface 308 is configured to communicate data between the call monitoring device 102 and other devices (e.g. network devices 110 and 116), systems, or domain. For example, the network interface 308 may comprise a WIFI interface, a LAN interface, a WAN interface, a modem, a switch, or a router. The processor 302 is configured to send and receive data using the network interface 308. The network interface 308 may be configured to use any suitable type of communication protocol as would be appreciated by one of ordinary skill in the art.

While several embodiments have been provided in the present disclosure, it should be understood that the disclosed systems and methods might be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted, or not implemented.

In addition, techniques, systems, subsystems, and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and could be made without departing from the spirit and scope disclosed herein.

To aid the Patent Office, and any readers of any patent issued on this application in interpreting the claims appended hereto, applicants note that they do not intend any of the appended claims to invoke 35 U.S.C. § 112(f) as it exists on the date of filing hereof unless the words "means for" or "step for" are explicitly used in the particular claim.

The invention claimed is:

1. A call monitoring device, comprising:
a network interface configured to receive phone calls; and
a processor operably coupled to the network interface, the processor configured to:
   obtain at least a portion of a phone call, wherein the phone call is associated with (a) metadata that identifies keywords used during the phone call and characteristics of a voice signal associated with the phone call; and (b) a transcript for the phone call, the transcript comprising text;
   input the transcript and the metadata into a machine learning model, wherein:
      the machine learning model is configured to generate a call profile based on text from the transcript and the metadata for the phone call; and
      the call profile comprises a first call classification for the phone call;
   receive the call profile from the machine learning model in response to inputting the transcript and the metadata into the machine learning model;
   identify a call log associated with the phone call, wherein the call log comprises a second call classification for the phone call;
   compare the first call classification to the second call classification;
   determine the first call classification does not match the second call classification;
   generate a feedback report that identifies the first call classification in response to determining that the first call classification does not match the second call classification; and
   output the feedback report.

2. The device of claim 1, wherein:
the call profile further comprises one or more priority flags that are each associated with an issue type; and
the processor is further configured to:
   determine the call profile comprises at least one priority flag that is set;
   forward the call profile to a network device associated with a quality control unit;
   receive user feedback from the network device in response to forwarding the call profile to the network device; and
   populate the feedback report based on the user feedback.

3. The device of claim 1, wherein:
the call profile further comprises one or more priority flags that are each associated with an issue type; and
the processor is further configured to:
   determine the call profile comprises at least one priority flag that is set;
   forward the call profile to a network device associated with a quality control unit;
   receive user feedback from the network device in response to forwarding the call profile to the network device;
   determine the first call classification is incorrect based on the user feedback; and
   generate training data for the machine learning model based on the user feedback.

4. The device of claim 1, wherein outputting the feedback report comprises:
   identifying a group within an enterprise based on keywords used in the phone call; and
   sending the call profile to a network device associated with the identified group.

5. The device of claim 1, wherein outputting the feedback report comprises sending the feedback report to a network device.

6. The device of claim 1, wherein the characteristics of the voice signal comprises a speech tone for a person on the phone call.

7. The device of claim 1, wherein the characteristics of the voice signal comprise a speech rate for a person on the phone call.

8. The device of claim 1, wherein obtaining the phone call comprises obtaining a recording of the phone call.

9. A call monitoring method, comprising:
   obtaining at least a portion of a phone call, wherein the phone call is associated with (a) metadata that identifies keywords used during the phone call and characteristics of a voice signal associated with the phone call; and (b) a transcript for the phone call, the transcript comprising text;
   inputting the transcript and the metadata into a machine learning model wherein:
      the machine learning model is configured to generate a call profile based on text from the transcript and the metadata for the phone call; and
      the call profile comprises a first call classification for the phone call;
   receiving the call profile from the machine learning model in response to inputting the transcript and the metadata into the machine learning model;

identifying a call log associated with the phone call, wherein the call log comprises a second call classification for the phone call;

comparing the first call classification to the second call classification;

determining the first call classification does not match the second call classification;

generating a feedback report that identifies the first call classification in response to determining that the first call classification does not match the second call classification; and outputting the feedback report.

10. The method of claim 9, wherein:

the call profile further comprises one or more priority flags that are each associated with an issue type; and further comprising:

determining the call profile comprises at least one priority flag that is set;

forwarding the call profile to a network device associated with a quality control unit;

receiving user feedback from the network device in response to forwarding the call profile to the network device; and populating the feedback report based on the user feedback.

11. The method of claim 9, wherein:

the call profile further comprises one or more priority flags that are each associated with an issue type; and further comprising:

determining the call profile comprises at least one priority flag that is set;

forwarding the call profile to a network device associated with a quality control unit;

receiving user feedback from the network device in response to forwarding the call profile to the network device;

determining the first call classification is incorrect based on the user feedback; and generating training data for the machine learning model based on the user feedback.

12. The method of claim 9, wherein outputting the feedback report comprises:

identifying a group within an enterprise based on keywords used in the phone call; and sending the call profile to a network device associated with the identified group.

13. The method of claim 9, wherein outputting the feedback report comprises sending the feedback report to a network device.

14. The method of claim 9, wherein the characteristics of the voice signal comprises a speech tone for a person on the phone call.

15. The method of claim 9, wherein the characteristics of the voice signal comprise a speech rate for a person on the phone call.

16. The method of claim 9, wherein obtaining the phone call comprises obtaining a recording of the phone call.

17. A computer program comprising executable instructions stored in a non-transitory computer readable medium that when executed by a processor causes the processor to:

obtain at least a portion of a phone call, wherein the phone call is associated with (a) metadata that identifies keywords used during the phone call and characteristics of a voice signal associated with the phone call; and (b) a transcript for the phone call, the transcript comprising text;

input the transcript and the metadata into a machine learning model wherein:

the machine learning model is configured to generate a call profile based on text the transcript and the metadata for the phone call; and the call profile comprises a first call classification for the phone call;

receive the call profile from the machine learning model in response to inputting the transcript and the metadata into the machine learning model;

identify a call log associated with the phone call, wherein the call log comprises a second call classification for the phone call;

compare the first call classification to the second call classification;

determine the first call classification does not match the second call classification;

generate a feedback report that identifies the first call classification in response to determining that the first call classification does not match the second call classification; and output the feedback report.

18. The computer program of claim 17, wherein:

the call profile further comprises one or more priority flags that are each associated with an issue type; and further comprising instructions that when executed by the processor causes the processor to:

determine the call profile comprises at least one priority flag that is set;

forward the call profile to a network device associated with a quality control unit;

receive user feedback from the network device in response to forwarding the call profile to the network device; and populate the feedback report based on the user feedback.

19. The computer program of claim 17, wherein:

the call profile further comprises one or more priority flags that are each associated with an issue type; and further comprising instructions that when executed by the processor causes the processor to:

determine the call profile comprises at least one priority flag that is set;

forward the call profile to a network device associated with a quality control unit;

receive user feedback from the network device in response to forwarding the call profile to the network device;

determine the first call classification is incorrect based on the user feedback; and generate training data for the machine learning model based on the user feedback.

20. The computer program of claim 17, wherein outputting the feedback report comprises sending the feedback report to a network device.

* * * * *